United States Patent
Hirokawa

[15] 3,665,281
[45] May 23, 1972

[54] AUTOPILOT FOR SHIP

[72] Inventor: Yoichi Hirokawa, Kamakura-shi, Japan

[73] Assignee: Kabushiki Kaisha Tokyo Keiki Seizosho (Tokyo Keiki Seizosho Co., Ltd.), Tokyo, Japan

[22] Filed: Oct. 27, 1969

[21] Appl. No.: 869,546

[30] Foreign Application Priority Data

Nov. 1, 1968  Japan......................................43/79723

[52] U.S. Cl..............................................318/588, 318/580
[51] Int. Cl. ........................................G05d 1/00, B64c 13/18
[58] Field of Search..................318/580, 587, 588, 599, 560, 318/569, 602, 603, 565; 235/150.26

[56] References Cited

UNITED STATES PATENTS

| | | |
|---|---|---|
| 2,811,325 | 10/1952 | Adkisson..........................235/150.26 |
| 2,973,927 | 3/1961 | Miller et al..........................318/565 X |
| 3,372,321 | 3/1968 | Inaba et al. ..........................318/603 X |
| 2,891,205 | 6/1959 | Freeman................................318/588 |
| 3,172,026 | 3/1965 | Schuman ..........................318/569 X |
| 3,280,781 | 10/1966 | Koerner..............................318/588 X |

*Primary Examiner*—Benjamin Dobeck
*Attorney*—Hill, Sherman, Meroni, Gross & Simpson

[57] ABSTRACT

An autopilot for a ship in which a course of a ship is calculated by a computer mounted in the ship and an output of the computer is supplied to the autopilot through a servo system to automatically steer the ship and having a gate circuit inserted between the servo system and the autopilot, the gate circuit being controlled by the output of the computer to thereby steer the ship automatically.

4 Claims, 3 Drawing Figures

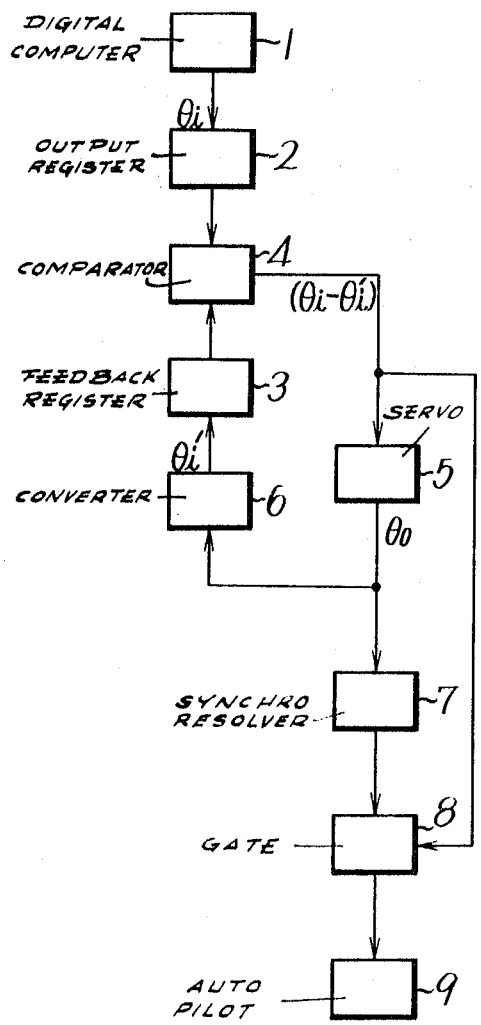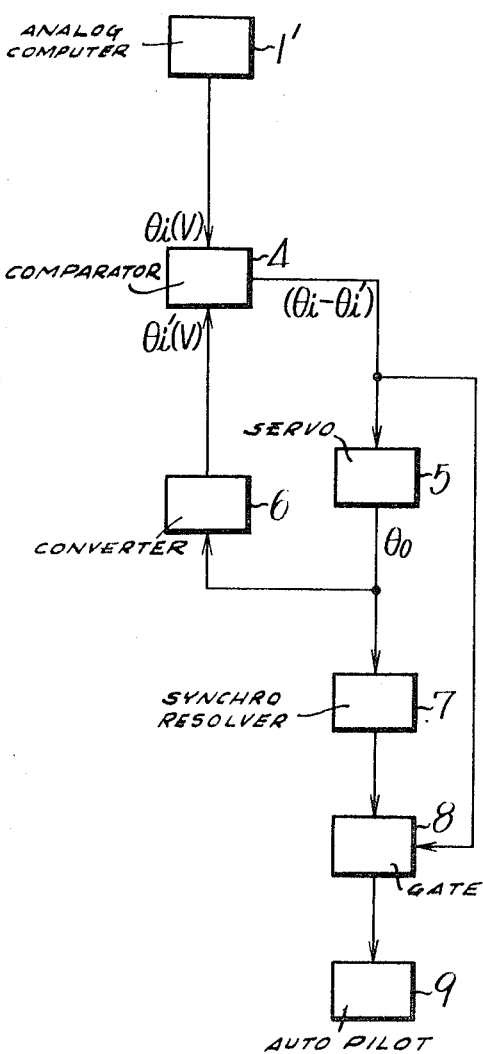

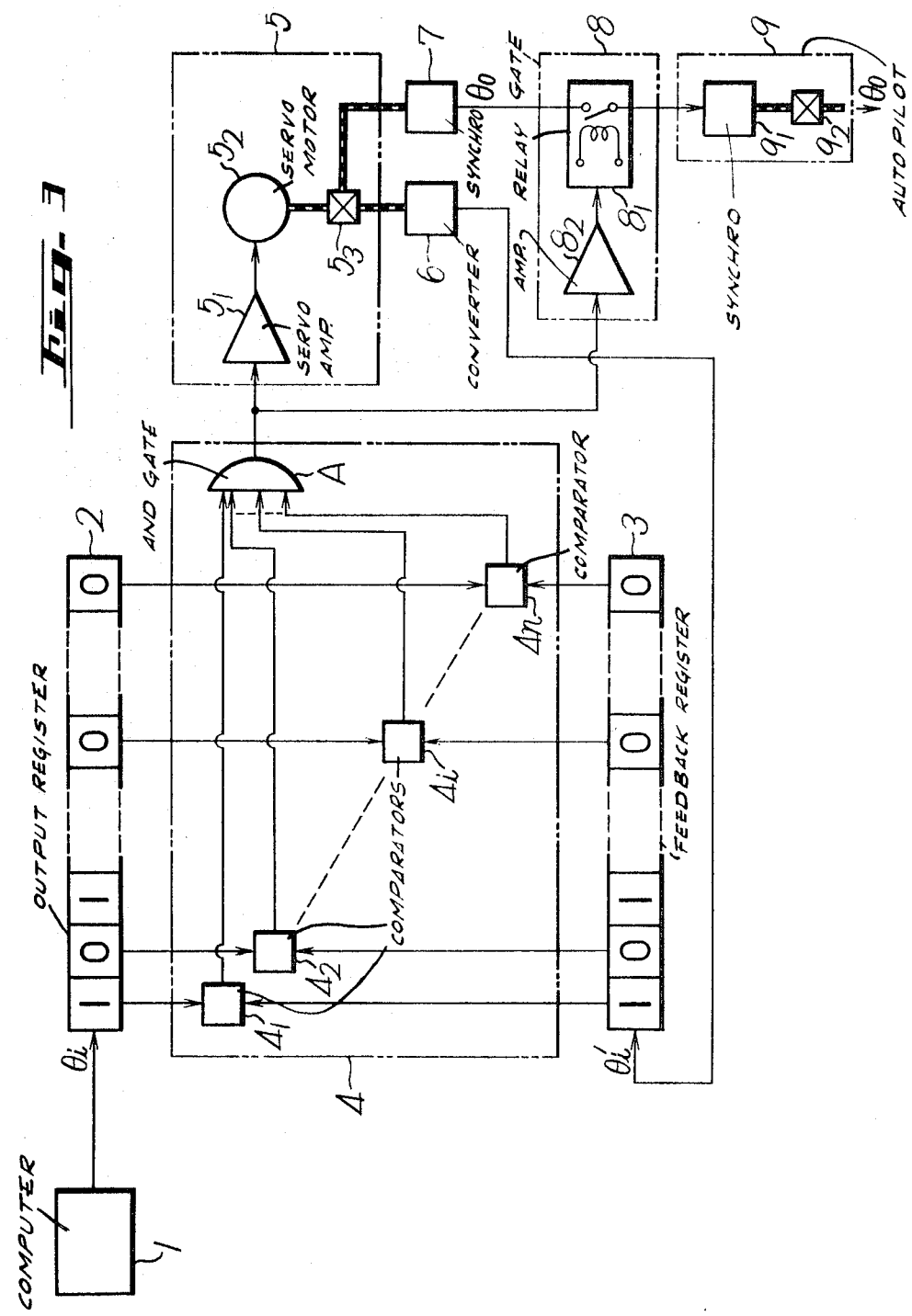

3,665,281

AUTOPILOT FOR SHIP

BACKGROUND OF THE INVENTION

1. Field of the Invention

The present invention relates to an autopilot and more particularly to an autopilot employing a computer.

2. Description of the Prior Art

Generally speaking, an autopilot is such an apparatus that detects a difference between a set course and a actual course of a vehicle such as, for example, a ship as an electric signal is generated and furnished to a servo system to control the actual course of the ship so that it is coincidence with the set course.

In prior art autopilot apparatus, the set course of the ship is determined by a crew or operator of the ship and then the set course is fed into the autopilot by the crew. According to prior art autopilot apparatus, the autopilot only maintains the ship's heading deviating from the set course.

Recently computers have been installed in ships and the computer can be utilized for determining a course for the ship, as well as controlling the conditions and environment of the ship. A device is installed in the ship for transmitting the set course determined by the computer to the autopilot of the ship as a set course for the autopilot, and thus an autopilot for the ship can be obtained, which maintains a proper course.

However, when the course along the ship moves is determined by the computer, there is a danger that the orders, instructions or commands produced by the computer will be incorrectly transmitted to the autopilot. Also, it is possible that trouble will occur in the transmission system of the instructions or commands from the computer to the autopilot and when this occurs, the ship is exposed to danger.

SUMMARY OF THE INVENTION

An object of the present invention is to provide an autopilot which has means for correctly transmitting an instruction or command signal from a computer on a ship to the autopilot and for preventing the autopilot from being receiving incorrect instruction or command signals from the computer.

Another object of the present invention is to provide an autopilot which has a transmission system which positively prevents an instruction or command signal from a computer from being incorrectly applied to an autopilot of a ship.

Another object of the present invention is to provide an autopilot which incorrect instruction or command signals from being supplied to the autopilot even when the transmission system is out of order and thus the ship is always safely operated.

Another object of the present invention is to provide an autopilot which includes means for transmitting an output of high accuracy (effective or significant figure) from a digital computer to an autopilot of a ship as a set course without decreasing the high accuracy of the output.

Still another object of the present invention is to provide an autopilot for supplying command signals for setting a course from an analog and digital computer to the autopilot.

BRIEF DESCRIPTION OF THE DRAWINGS

FIG. 1 is a systematic block diagram illustrating an example of an autopilot according to the present invention;

FIG. 2 is a systematic block diagram illustrating another example of the present invention; and FIG. 3 is a schematic diagram illustrating a practical example of the present invention.

DESCRIPTION OF THE PREFERRED EMBODIMENTS

Before explaining the present invention in detail, a computer employed in a ship will be explained.

In general, a computer provided in a ship is used for carrying out, for example, calculations of inertial navigation such as astronomical calculation, determination of a ship's position and the like, calculation of loading and fuel, labor management of crews, collection and analysis of respective data of the engine and the body-stress of the ship and the like. Since the computer is mounted in the ship for dealing with many kinds of data, and since the computer has the ability to calculate the most desirable courses for the ship's navigation, it may also be used for navigation.

However, since the computer is employed to calculate many kinds of data it is operated in time-division manner so that the many jobs can be accomplished. Thus, where the calculated values by the computer are sequentially used, it is necessary to store the calculated values in output registers. The content of the output registers are interchanged whenever the result of the set course calculation is changed, which means that where the great circle route (or course) is selected many changes in course must be calculated.

The present invention will be explained with reference to the example shown in FIG. 1. In FIG. 1 reference numeral 1 designates a digital computer from which a signal corresponding to a set course $\theta i$ is delivered. The signal corresponding to the set course $\theta i$ is supplied to an output register 2 to be stored therein. Reference numeral 4 designates a comparator to which an output or stored content of the output register 2 and that of a feedback register 3 are respectively supplied. The comparator 4 compares both the stored contents of the output and feedback registers 2 and 3. When the contents of the registers differ, the comparator 4 provides an output $(\theta i - \theta i')$. The output of the comparator 4 is applied to a servo system 5. The output shaft of the servo system 5 is then rotated by the degrees to a position corresponding to the set course $\theta i$. This is because a loop including an A-D converter 6 such as a shaft-position-encoder is driven by the output shaft of the servo system 5. Thus the A-D converter 6 provides the output of the servo system 5 to the feedback register 3.

When an output $\theta i'$ of the A-D converter 6 is equal to the set course $\theta i$ the memorized contents of the output register 2 become equal to those of the feedback register 3. As a result no output is delivered from the comparator 4 the servo system 5 stops.

The output shaft of the servo system 5 an electric angle converter 7 such as a synchro, resolver or the like. The output of the electric angle converter 7 is supplied to an autopilot 9 through a gate circuit 8. The output electrical signal from the electric angle converter 7 is supplied to the autopilot 9 to automatically set the steering angle of the ship to the (set) course $\theta i$. In this example, the gate circuit 8 is controlled by the output of the comparator 4 so that only when no output is delivered from the comparator 4 will the gate circuit 8 be conductive. That is, when the output from the computer 1, namely the instruction or command course $\theta i$ correctly coincides with the angle of the output shaft of the servo system 5, the instruction or command signal is applied to the autopilot 9 through the gate circuit 8. As a result in the example shown in FIG. 1 the output from the computer 1 is applied to the autopilot 9 without failure of the equipment. Further, according to the present example even if any trouble occurs in the transmission system, there is no danger that incorrect changes of the course will occur due to the action of the gate circuit 8 in the transmission system.

It is to be understood that a transient phenomenon which occurs with the operation of the servo system 5 when the set course is changed has no effect on the autopilot 9 due to the gate circuit 8 and its controlling system.

Accordingly, the servo system used in the example shown in FIG. 1 need not have high transient response and other characteristics, so that a servo system of simple construction is sufficient for the present invention.

FIG. 2 is another example of the present invention in which an analog computer 1' is employed and reference numerals similar to those in FIG. 1 represent similar elements. In this example, the output from the analog computer 1', namely the instruction or command signal (voltage signal) $\theta i$ is compared with the voltage signal $\theta i'$ corresponding to the output angle $\theta o$ of the servo system 5 in the comparator 4 and the output ($\theta i - \theta i'$) of the comparator 4 is applied to the servo system 5. As a result the servo system 5 is driven so that its output shaft has an angle $\theta o$ which brings the difference $\theta i - \theta i'$ to zero.

The synchro-resolver 7 mechanically coupled to the output shaft of the servo system 5, converts the output angle of the servo system 5 to an electrical signal. The electrical signal thus obtained from the synchroresolver 7 is then transmitted to the autopilot 9 through the gate circuit 8. Thus, the instruction or command course $\theta i$ (voltage) obtained by the analog computer 1' becomes the set course for the autopilot 9. In the FIG. 2 example, the operation of the gate circuit 8 is similar to that of the FIG. 1 example, that is, when the output applied to the servo system 5 becomes zero the gate circuit 8 is made conductive. Accordingly, only when the output of the servo system 5 becomes zero, that is when the instruction or command signal $\theta i$ (voltage) exactly coincides with the voltage corresponding to the output angle $\theta o$, will the output of the synchro-resolver 7 be applied to the autopilot 9.

The example shown in FIG. 2 has the same advantages as explained in connection with the example depicted in FIG. 1.

By employing a servo system having a suitable time constant as the servo system 5 of the present invention, it is possible to prevent the servo system 5 from responding abruptly to an output of the digital computer which output is greatly changed in value, so that the autopilot is prevented from changing change its set course due to the fact that the input applied to the servo system 5 does not reach zero. If the computer again provides an output similar to the previous one during the following scanning cycle, the servo system will finish its tracking operations and render the gate circuit conductive and then the set course of the autopilot will be changed. On the other hand, if there occurs an error in the computer, the servo system is not driven and a corrected output will be delivered from the computer during the following scanning cycle.

A practical embodiment of the present invention will be explained in detail, with reference to FIG. 3 in which reference numerals and characters similar to those of FIG. 1 represent similar components.

In the FIG. 3 example, an output register 2 is a $n$-bit register and a feedback register 3 also a $n$-bit register. A comparator 4 in this example includes a plurality of comparators (in this example $n$ comparators) $4_1$, $4_2$, ....$4_i$, ....$4_n$ for comparing the outputs of the output and feedback $n$-bit registers 2 and 3 respectively. The outputs of the respective comparators $4_1$, $4_2$, .....$4_n$ are respectively applied to an AND-gate circuit A which is a component of the comparator 4 in FIG. 1 example. The output of the AND-gate circuit A is applied to the servo system 5, that is, to a servo motor $5_2$ through a servo amplifier $5_1$. The servo motor $5_2$ drives a gear train $5_3$. The servo amplifier $5_1$, servo motor $5_2$ and gear $5_3$ comprise the servo system 5 shown in FIG. 1. The gear $5_3$ drives a shaft position encoder 6 (corresponding to the A-D converter 6 in FIG. 1). As a result, the output angle of the servo system 5 is again fedback to the feedback $n$-bit register 3 as a feedback signal of a $n$-bit digital code. The servo system 5, the shaft position encoder 6, the $n$-bit feedback register 3 and the comparator 4 constitute the feedback loop of this device.

In the example shown in FIG. 3, a synchro torque transmitter 7 (corresponding to the angle-electric converter 7 in the FIG. 1 example) is coupled to another output shaft of the gear train $5_3$. The output of the synchro torque transmitter 7 is applied, through a gate circuit 8 to an autopilot 9, through a synchro torque receiver $9_1$. The output shaft of the synchro torque receiver $9_1$ is coupled to a course setting knob (not shown) of the autopilot 9 through a gear train $9_2$. The synchro torque receiver $9_1$ and the gear train $9_2$ constituting the autopilot 9.

The gate circuit 8 of the FIG. 3 example comprises a relay $8_1$ and a relay amplifier $8_2$. The relay $8_1$ is a break contact type. One part of the output of the AND-gate circuit A is applied to the relay amplifier $8_2$ the whose output of which is applied to the relay $8_1$ to operate it in the manner above in connection with FIG. 1.

It will be apparent that many modifications and variations may be effected without departing from the novel concept of the present invention.

I claim as my invention:

1. An autopilot system for a ship comprising:
    a computer for calculating a course of a ship;
    an output register supplied with the output of said computer;
    a feedback register;
    a comparator for comparing the outputs of said output and feedback registers;
    an AND-gate supplied with the output of said comparator;
    a servo system including a servo amplifier, a servo motor and a gear train, and an analog to digital converter driven by said servo motor, the output of said analog to digital converter feedback to said feedback register;
    a synchro torque transmitter driven by said servo motor;
    an autopilot including a synchro torque receiver supplied with the output of said synchro torque transmitter as a set course of said autopilot for maintaining said ship in accordance with the set course;
    a second gate circuit connected between said synchro torque transmitter and said synchro torque receiver, said second gate circuit controlled by the output of said AND-gate, whereby when said AND-gate generates an output, said second gate circuit is opened to inhibit the passage of the output of said synchro torque transmitter to said synchro torque receiver and when said AND-gate produces zero output said second gate circuit is closed to permit the passage of the output of said synchro torque transmitter to said synchro torque receiver so as to drive said autopilot in accordance with the set course of said computer.

2. An autopilot system for a ship as claimed in claim 1 wherein said computer is a digital computer.

3. An autopilot system for a ship as claimed in claim 1 in which said computer is an analog computer.

4. An autopilot system for a ship as claimed in claim 1 wherein said output register has a plurality of elements for bit storage, said feedback register has the same number of elements for bit storage as said output register, and said comparator has the same number of elements as said output and feedback registers, each of said comparator elements comparing the outputs of said each of said bit elements of said output and feedback registers and supplying the output to said AND-gate.

* * * * *